United States Patent
Ahn

(10) Patent No.: US 9,837,025 B2
(45) Date of Patent: Dec. 5, 2017

(54) ORGANIC LIGHT-EMITTING DIODE (OLED) DISPLAY AND METHOD OF DRIVING THE SAME

(71) Applicant: Samsung Display Co., Ltd., Yongin, Gyeonggi-do (KR)

(72) Inventor: Jeong-Keun Ahn, Suwon-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 352 days.

(21) Appl. No.: 14/626,690

(22) Filed: Feb. 19, 2015

(65) Prior Publication Data

US 2016/0055802 A1 Feb. 25, 2016

(30) Foreign Application Priority Data

Aug. 25, 2014 (KR) .................. 10-2014-0110656

(51) Int. Cl.
*G09G 3/32* (2016.01)
*G09G 3/00* (2006.01)
(Continued)

(52) U.S. Cl.
CPC ........... *G09G 3/3275* (2013.01); *G09G 3/003* (2013.01); *G09G 3/2022* (2013.01);
(Continued)

(58) Field of Classification Search
CPC .......... H04N 13/0486; H04N 13/0454; G06G 3/3275; G06G 3/003; G06G 3/3225;
(Continued)

(56) References Cited

U.S. PATENT DOCUMENTS

2008/0118172 A1* 5/2008 Kim ..................... H04N 1/4072
 382/260
2009/0278866 A1* 11/2009 Kim ........................ G09G 3/20
 345/690

(Continued)

FOREIGN PATENT DOCUMENTS

KR 10-2003-0086892 A 11/2003
KR 10-2013-0002702 A 1/2013

(Continued)

OTHER PUBLICATIONS

Extended European Search Report dated Jul. 15, 2015 for European Patent Application No. EP 15 169 587.1 which shares priority of Korean Patent Application No. KR 10-2014-0110656 with subject U.S. Appl. No. 14/626,690.

*Primary Examiner* — Ariel Balaoing
(74) *Attorney, Agent, or Firm* — Knobbe Martens Olson & Bear LLP

(57) ABSTRACT

An organic light-emitting diode (OLED) display and method of driving the same are disclosed. In one aspect, the OLED display includes a display panel including a plurality of pixels and a data driver configured to apply a data signal to the display panel in one of two-dimensional (2D) and stereoscopic display modes. The display also includes a controller configured to convert an image signal to 2D image data for the pixels at each of N×k sub-fields in the 2D display mode and convert the image signal to stereoscopic image data for the pixels at each of N sub-fields in the stereoscopic display mode, where N and k are integers greater than 1. The display further includes a frame memory configured to store the 2D image data in the 2D display mode and the stereoscopic image data in the stereoscopic display mode.

20 Claims, 11 Drawing Sheets

(51) Int. Cl.
  *G09G 5/39* (2006.01)
  *H04N 13/04* (2006.01)
  *G09G 3/3275* (2016.01)
  *G09G 3/20* (2006.01)
  *G09G 3/3225* (2016.01)
  *G09G 5/393* (2006.01)
  *G09G 5/397* (2006.01)

(52) U.S. Cl.
  CPC ........... *G09G 3/3225* (2013.01); *G09G 5/393* (2013.01); *G09G 5/397* (2013.01); *H04N 13/0454* (2013.01); *H04N 13/0486* (2013.01); *H04N 13/0497* (2013.01); *G09G 2360/18* (2013.01)

(58) Field of Classification Search
  CPC ...... G06G 3/2022; G06G 5/397; G06G 5/393; G06G 2360/18
  See application file for complete search history.

(56) References Cited

U.S. PATENT DOCUMENTS

| | | | |
|---|---|---|---|
| 2011/0273439 A1* | 11/2011 | Son | H04N 13/0438 345/419 |
| 2011/0279659 A1* | 11/2011 | Jung | G09G 3/3648 348/54 |
| 2012/0026147 A1* | 2/2012 | Komiya | G09G 3/3233 345/211 |
| 2012/0026155 A1 | 2/2012 | Komiya et al. | |
| 2012/0274748 A1* | 11/2012 | Hwang | G02B 27/26 348/51 |
| 2013/0069993 A1 | 3/2013 | Nishimori et al. | |
| 2013/0093864 A1 | 4/2013 | Yamazaki et al. | |
| 2015/0170561 A1 | 6/2015 | Ahn et al. | |

FOREIGN PATENT DOCUMENTS

| | | |
|---|---|---|
| KR | 10-2013-0091546 A | 8/2013 |
| WO | WO 2005/099279 A1 | 10/2005 |

* cited by examiner

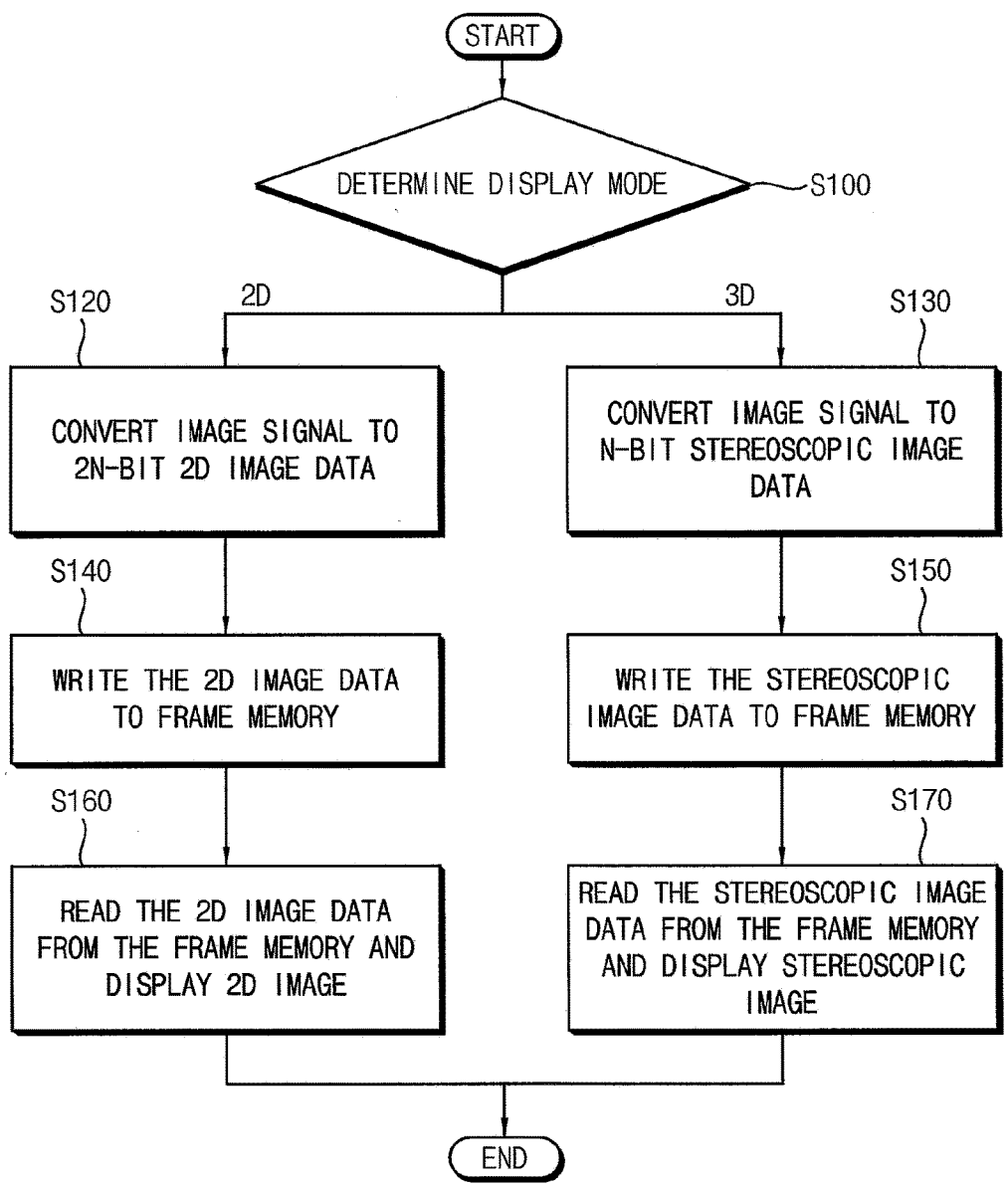

ORGANIC LIGHT-EMITTING DIODE (OLED) DISPLAY AND METHOD OF DRIVING THE SAME

CROSS REFERENCE TO RELATED APPLICATION

This application claims priority from and the benefit of Korean Patent Applications No. 10-2014-0110656, filed on Aug. 25, 2014 in the Korean Intellectual Property Office (KIPO), the disclosure of which is hereby incorporated by reference herein in its entirety.

BACKGROUND

Field

The described technology generally relates to organic light-emitting diode (OLED) displays and methods of driving the same.

Description of the Related Art

Display devices that can output images in a two-dimensional (2D) display mode and a stereoscopic (e.g., a three-dimensional (3D)) display mode have recently been a focus of research and development.

Further, digital driving techniques, which generally have a simplified structure compared to analog driving techniques, have also been under development for OLED displays. In digital techniques, each frame is produced by displaying a plurality of sub-frames. That is, one frame is divided into a plurality of sub-frames, where the emission time of each sub-frame is varied. A specific gray level is displayed by a pixel based on the sum of emission periods of the selected sub-frames.

SUMMARY OF CERTAIN INVENTIVE ASPECTS

One inventive aspect is an OLED display that can output 2D images and 3D images when receiving image data at a uniform input frequency.

Another aspect is a method of driving the OLED display.

Another aspect is a display comprising a display panel including a plurality of pixels, a scan driver configured to apply a scan signal to the display panel, a data driver configured to generate a data signal based on two-dimensional (2D) image data in a 2D display mode, to generate the data signal based on stereoscopic image data in a stereoscopic display mode, and to apply the data signal to the display panel, a controller configured to receive an image signal from an external image source, to convert the image signal to the 2D image data representing on or off states of the pixels at each of N×k sub-fields in the 2D display mode, and to convert the image signal to the stereoscopic image data representing on or off states of the pixels at each of N sub-fields, where N and k are integers greater than 1, and a frame memory configured to store one of the 2D image data and the stereoscopic image data.

In example embodiments, an input frequency of the image signal applied to the controller in the 2D display mode may be substantially the same as the input frequency of the image signal applied to the controller in the stereoscopic display mode.

In example embodiments, the 2D image data may be generated by a first look-up table that has a weight of each of the N×k sub-fields and on/off information at each of the N×k sub-fields corresponding to a gray level of the image signal of the 2D display mode.

In example embodiments, the stereoscopic image data may be generated by a second look-up table that has a weight of each of the N sub-fields and on/off information at each of the N sub-fields corresponding to a gray level of the image signal of the stereoscopic display mode.

In example embodiments, the weight of a J-th sub-field of the stereoscopic image data may be different from the weight of a J-th sub-field of the 2D image data, where J is a positive integer, and is less than or equal to N.

In example embodiments, the controller may include a memory controller configured to control the frame memory to store the 2D image data or the stereoscopic image data and to read the 2D image data or the stereoscopic image data from the frame memory, and a timing controller configured to transfer the 2D image data or the stereoscopic image data read from the frame memory to the data driver and to control the scan driver and the data driver.

In example embodiments, the controller may further include a display mode determination unit configured to receive the image signal, to determine whether a display mode of the OLED display is the 2D display mode or the stereoscopic display mode, to output the image signal to the first look-up table when the display mode is the 2D display mode, and to output the image signal to the second look-up table when the display mode is the stereoscopic display mode.

In example embodiments, the memory controller may include a first write controller configured to write the 2D image data of one frame to the frame memory, a second write controller configured to write the stereoscopic image data corresponding to a first half of the one frame to a first half of the frame memory, and to write the stereoscopic image data corresponding to a second half of the one frame following the first half to a second half of the frame memory, and a read controller configured to read the 2D image data from the frame memory, and to read the stereoscopic image data from the first half and the second half of the frame memory.

In example embodiments, the memory controller may include a first write controller configured to write the 2D image data of one frame to the frame memory, a second write controller configured to write the stereoscopic image data corresponding to a half of the one frame to a half of the frame memory, a first read controller configured to read the 2D image data from the frame memory, and a second read controller configured to read the stereoscopic image data from the half of the frame memory.

In example embodiments, the second look-up table may convert the image signal to two stereoscopic image data each representing on or off states of the pixels at each of N sub-fields when k is 2.

In example embodiments, the two stereoscopic image data may be substantially the same.

In example embodiments, the memory controller may include a write controller configured to write one of the stereoscopic image data from the second look-up table to a first half of the frame memory and to write the other of the stereoscopic image data from the second look-up table to a second half of the frame memory, and a read controller configured to read the stereoscopic image data from the frame memory.

In example embodiments, the write controller may write the 2D image data of the one frame to the frame memory and the read controller may read the 2D image data from the frame memory.

In example embodiments, the data signal may be applied to the display panel in a progressive emission with simultaneous scan (PESS) method.

Another aspect is an OLED display comprising determining whether a display mode of the OLED display is a two-dimensional (2D) display mode or a stereoscopic display mode, wherein an image signal is applied from an external source to a controller in an input frequency, converting the image signal to 2D image data representing on or off states of a plurality of pixels included in the OLED display at each of 2N-sub-fields when the display mode is the 2D display mode, where N is an integer greater than 1, and converting the image signal to stereoscopic image data representing on or off states of the pixels at each of N-sub-fields when the display mode is the stereoscopic display mode.

In example embodiments, the input frequency of the image signal applied to the controller in the 2D display mode may be substantially the same as the input frequency of the image signal applied to the controller in the stereoscopic display mode.

In example embodiments, the 2D image data may be generated by a first look-up table that has a weight of each of the 2N-sub-fields and on/off information at each of the 2N-sub-fields corresponding to a gray level of the image signal of the 2D display mode and the stereoscopic image data may be generated by a second look-up table that has a weight of each of the N-sub-fields and on/off information at each of the N-sub-fields corresponding to a gray level of the image signal of the stereoscopic display mode.

In example embodiments, the weight of a J-th sub-field of the stereoscopic image data may be different from the weight of a J-th sub-field of the 2D image data, where J is a positive integer, and is less than or equal to N.

In example embodiments, converting the image signal to the stereoscopic image data may include writing the stereoscopic image data of a first frame to a first half of the frame memory and the stereoscopic image data of a second frame following the first frame to a second half of the frame memory, and reading the stereoscopic image data from the first half and the second half of the frame memory to display a stereoscopic image.

In example embodiments, converting the image signal to the 2D image data may include writing the 2D image data of one frame to the frame memory and reading the 2D image data from the frame memory to display a 2D image.

Another aspect is an OLED display comprising a display panel including a plurality of pixels; a scan driver configured to apply a scan signal to the display panel; a data driver configured to generate a data signal based on: i) two-dimensional (2D) image data in a 2D display mode and ii) stereoscopic image data in a stereoscopic display mode, wherein the data driver is further configured to apply the data signal to the display panel; a controller configured to: i) receive an image signal, ii) convert the image signal to the 2D image data representing on or off states of the pixels at each of N×k sub-fields in the 2D display mode, and iii) convert the image signal to the stereoscopic image data representing on or off states of the pixels at each of N sub-fields in the stereoscopic display mode, where N and k are integers greater than 1; and a frame memory configured to store the 2D image data in the 2D display mode and the stereoscopic image data in the stereoscopic display mode.

In example embodiments, the input frequency of the image signal applied to the controller in the 2D display mode is substantially the same as the input frequency of the image signal applied to the controller in the stereoscopic display mode. The OLED display can further comprise a first look-up table storing data used to generate the 2D image data based on a weight for each of the N×k sub-fields and on/off information at each of the N×k sub-fields corresponding to a gray level of the image signal. The OLED display can further comprise a second look-up table storing data used to generate the stereoscopic image data based on a weight for each of the N sub-fields and on/off information at each of the N sub-fields corresponding to a gray level of the image signal. The weight of a J-th sub-field of the stereoscopic image data can be different from the weight of a J-th sub-field of the 2D image data, where J is a positive integer and is less than or equal to N.

In example embodiments, the controller includes a memory controller configured to: i) control the frame memory to store the 2D image data and the stereoscopic image data and ii) read the 2D image data and the stereoscopic image data from the frame memory; and a timing controller configured to: i) transfer the 2D image data and the stereoscopic image data read from the frame memory to the data driver and ii) control the scan driver and the data driver, wherein k is 2. The controller can further include a display mode determination unit configured to: i) receive the image signal, ii) determine whether the OLED display is in the 2D display mode or the stereoscopic display mode, iii) output the image signal to the first look-up table when the OLED display is in the 2D display mode, and iv) output the image signal to the second look-up table when the OLED display is in the stereoscopic display mode.

In example embodiments, the memory controller includes a first write controller configured to write the 2D image data of one frame to the frame memory; a second write controller configured to: i) write the stereoscopic image data corresponding to a first half of one frame to a first half of the frame memory and ii) write the stereoscopic image data corresponding to a second half of one frame to a second half of the frame memory; and a read controller configured to: i) read the 2D image data from the frame memory and ii) read the stereoscopic image data from the first and second halves of the frame memory. The memory controller can include a first write controller configured to write the 2D image data of one frame to the frame memory; a second write controller configured to write the stereoscopic image data corresponding to a half of one frame to a half of the frame memory; a first read controller configured to read the 2D image data from the frame memory; and a second read controller configured to read the stereoscopic image data from the half of the frame memory.

In example embodiments, the second look-up table further stores data used to convert the image signal to two stereoscopic image data each representing on or off states of the pixels at each of N sub-fields when k is 2. The two stereoscopic image data can be substantially the same. The memory controller can include a write controller configured to: i) write one of the stereoscopic image data from the second look-up table to a first half of the frame memory and ii) write the other of the stereoscopic image data from the second look-up table to a second half of the frame memory; and a read controller configured to read the stereoscopic image data from the frame memory. The write controller can be further configured to write the 2D image data of one frame to the frame memory and the read controller can be further configured to read the 2D image data from the frame memory. The data signal can be applied to the display panel in a progressive emission with simultaneous scan (PESS) method.

Another aspect is a method of driving an OLED display comprising determining whether a display mode of the OLED display is a two-dimensional (2D) display mode or a stereoscopic display mode, wherein the OLED display comprises a plurality of pixels and a controller configured to receive an image signal from an external source at an input frequency; converting the image signal to 2D image data representing on or off states of the pixels at each of 2N-sub-fields when the display mode is the 2D display mode, where N is an integer greater than 1; and converting the image signal to stereoscopic image data representing on or off states of the pixels at each of N-sub-fields when the display mode is the stereoscopic display mode.

In example embodiments, the input frequency of the image signal applied to the controller in the 2D display mode is substantially the same as the input frequency of the image signal applied to the controller in the stereoscopic display mode. The OLED display can further comprise first and second look-up tables and the method can further comprise generating the 2D image data based on data stored in the first look-up table including a weight of each of the 2N-sub-fields and on/off information at each of the 2N-sub-fields corresponding to a gray level of the image signal; and generating the stereoscopic image data based on data stored in the second look-up table including a weight of each of the N-sub-fields and on/off information at each of the N-sub-fields corresponding to a gray level of the image signal. The weight of a J-th sub-field of the stereoscopic image data can be different from the weight of a J-th sub-field of the 2D image data, where J is a positive integer, and is less than or equal to N.

In example embodiments, the OLED display further comprises a frame memory and converting the image signal to the stereoscopic image data comprises writing the stereoscopic image data of a first frame to a first half of the frame memory; writing the stereoscopic image data of a second frame following the first frame to a second half of the frame memory; and reading the stereoscopic image data from the first and second halves of the frame memory so as to display a stereoscopic image. The OLED display can further comprise a frame memory and converting the image signal to the 2D image data can comprise writing the 2D image data of one frame to the frame memory and reading the 2D image data from the frame memory so as to display a 2D image.

Therefore, the OLED display and the method of driving the OLED display according to at least one embodiment can receive the image signal in a constant input frequency regardless of the current display mode, convert the image signal to the 2D image data that is determined to be 2N-bit (or 3N-bit, 4N-bit, etc.), and convert the image signal to the stereoscopic image data that is determined to be a half of (or 1/3, 1/4, etc.) the 2D image data (i.e., N-bit). Thus, the output frequency of the controller compared with the constant input frequency is effectively doubled (or three times, four times) when the OLED display is driven in the stereoscopic display mode. As a result, it is not necessary to increase the input frequency in the stereoscopic display mode, and thus the power consumption can be decreased. Further, frequency amplification apparatuses such as a frequency acceleration engine, a frequency scaler, etc., are removed in the OLED display so that circuits of the OLED display can be simplified.

In addition, the construction of the memory controller is simplified according to the method of memory read/write operations. Thus, power consumption for driving the memory controller can be decreased.

BRIEF DESCRIPTION OF THE DRAWINGS

Example embodiments can be understood in more detail from the following description taken in conjunction with the accompanying drawings.

FIG. 5B is a block diagram illustrating an example of a stereoscopic image data stored in a frame memory due to the operation of the controller of FIG. 5A.

FIG. 6B is a block diagram illustrating an example of stereoscopic image data stored in a frame memory due to the operation of the controller of FIG. 6A.

FIG. 7B is a block diagram illustrating an example of stereoscopic image data stored in a frame memory due to the operation of the controller of FIG. 7A.

FIG. 8 is a flow chart illustrating a method of driving the OLED display according to example embodiments.

DETAILED DESCRIPTION OF CERTAIN INVENTIVE ASPECTS

The input frequency of a signal input to an OLED display is synchronized with external image data provided to the controller of the display. The input frequency is substantially the same as the output frequency which is synchronized with image data generated by the controller. In the 3D display mode, the display outputs a left-eye image and a right-eye image within one frame in order to prevent flicker. Accordingly, the output frequency in the 3D display mode must be doubled in comparison to the output frequency in the 2D display mode. Thus, in the 3D display mode, the input frequency must be doubled to match the doubled output frequency. As a result, a frequency amplification circuit having complex logic such as a frequency acceleration engine, a frequency scaler, etc., must be included in the display device. Therefore, in the 3D display mode, the power consumption of the controller and the generated heat increase.

Exemplary embodiments will be described more fully hereinafter with reference to the accompanying drawings, in which various embodiments are shown.

Figure 1:
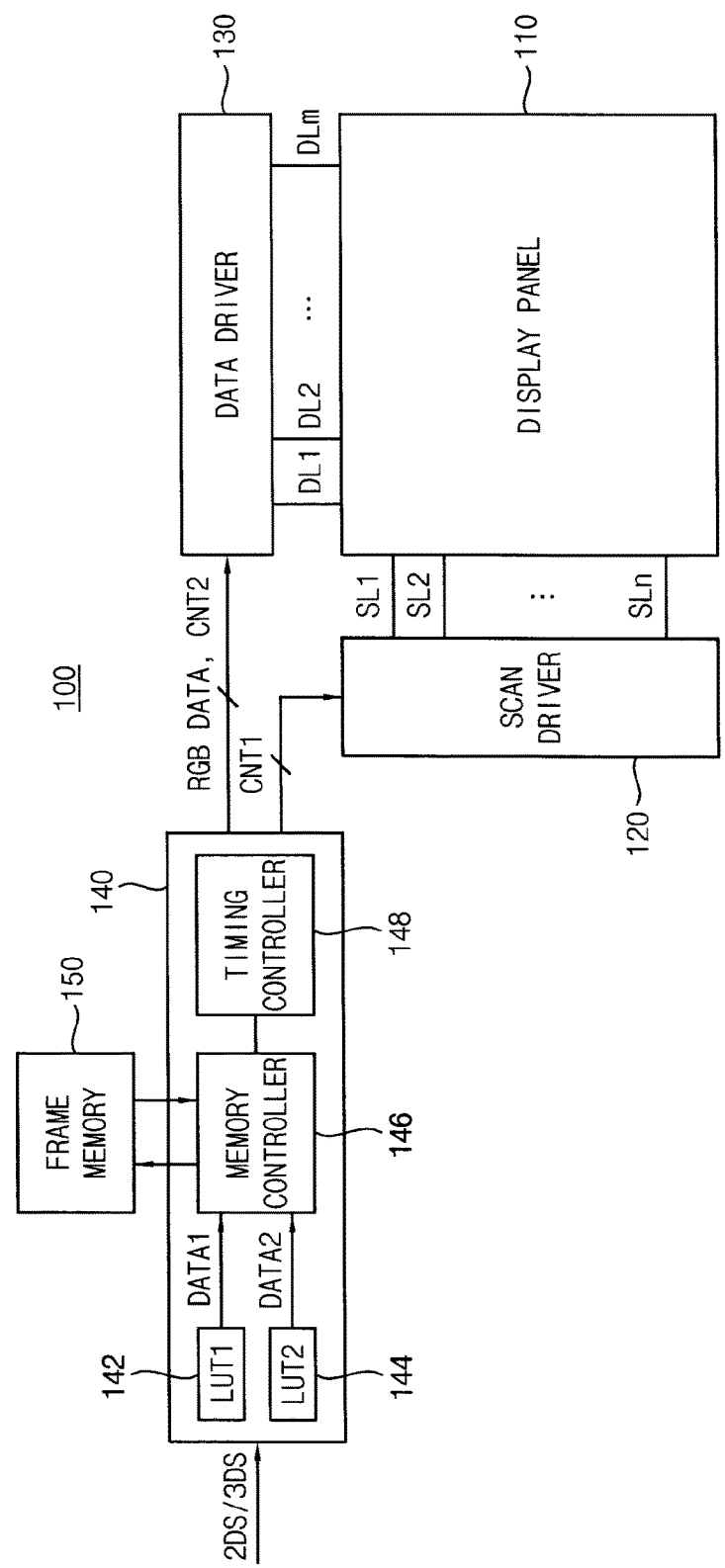
FIG. 1 is a block diagram illustrating an OLED display according to example embodiments.

FIG. 1 is a block diagram illustrating an organic light-emitting diode (OLED) display according to example embodiments.

Referring to FIG. 1, the OLED display 100 includes a display panel 110, a scan driver 120, a data driver 130, a controller 140, and a frame memory 150. The OLED display may employ a digital driving technique that divides one frame into a plurality of sub-fields. In one example embodiment, the OLED display 100 performs a data write operation via a progressive emission with simultaneous scan (PESS) method of the digital driving technique.

The display panel 110 includes a plurality of scan lines SL1 to SLn, a plurality of data lines DL1 to DLm, and a plurality of pixels respectively connected to the scan lines SL1 to SLn and the data lines DL1 to DLm. The pixels emit light having a certain gray level via the combination of on and off states of a plurality of sub-fields. The display panel 110 can display a two-dimensional (2D) image in a 2D display mode and a stereoscopic image (e.g., three-dimensional (3D) image) in a stereoscopic display mode (i.e., 3D display mode). Since these are examples, the display modes are not limited thereto. For example, the display mode may further include a 2D multi-view mode wherein the display panel displays a plurality of 2D images, and so on.

The scan driver 120 applies a scan signal to the pixels through the scan lines SL1 to SLn. The scan driver 120 generates scan signals in response to a first control signal CNT1 received from the controller 140. The scan driver 120 sequentially outputs the scan signals in a predetermined order to the scan lines SL1 to SLn.

The data driver 130 applies a data signal to the pixels through the data lines DL1 to DLm. The data driver 130 receives a second control signal CNT2 and pixel data RGB DATA from the controller 140. The data driver 130 generates a data signal based on the pixel data RGB DATA and outputs the data signal to the data lines DL1 to DLm.

The controller 140 can receive an image signal 2DS/3DS from external source(s). In one example embodiment, the controller 140 receives a 2D image signal 2DS in the 2D display mode and receives a stereoscopic image signal (e.g., a three-dimensional (3D) image signal) 3DS in the stereoscopic display mode. In one example embodiment, the input frequency of the image signal 2DS/3DS applied to the controller 140 in the 2D display mode is substantially the same as the input frequency of the image signal applied to the controller in the stereoscopic display mode. For example, the controller 140 receives the image signal 2DS/3DS at the input frequency 120 Hz when the display mode is both the 2D display mode and the stereoscopic display mode. That is, although the display mode of the OLED display 100 is changed, the input frequency of the image signal received from the external image sources is not changed (i.e., the input frequency is fixed to a predetermined value).

The controller 140 receives the image signal 2DS/3DS from the external image source, converts the image signal to a 2D image data DATA1 represented by a plurality of on or off states of the pixels at each of N×k sub-fields in the 2D display mode, and converts the image signal 2DS/3DS to the stereoscopic image data DATA2 represented by the on or off states of the pixels at each of N sub-fields, where N and k are integers greater than 1. When k is 2 and the controller 140 outputs the 2D image data DATA1 having 2N-bits to emit light within one frame, the controller 140 outputs the stereoscopic image data DATA2 having N-bits to emit light within a half of the frame. Thus, the stereoscopic image data DATA2 output within the one frame is about twice the 2D image data output within the same time period. In other words, the output frequency of the controller 140 in the stereoscopic display mode is about twice the output frequency of the controller 140 in the 2D display mode. However, the number of sub-fields in the stereoscopic display mode is not limited thereto. For example, if the 2D image data DATA1 includes information of the N sub-fields to emit light within one frame, the stereoscopic image data DATA2 may include information of N/3 sub-fields (or N/4 sub-fields) to emit light within ⅓ of a frame (or ¼ of a frame). Thus, the output frequency of the stereoscopic display mode may be about three times (or four times) the output frequency of the 2D display mode.

The controller 140 receives the image signal 2DS/3DS from the external source(s) (e.g., a host device) and applies control signals CLT1 and CLT2 and the image data RGB DATA to the data driver 130 and the scan driver 120. The controller 140 includes a first look-up table (LUT) 142, a second look-up table 144, a memory controller 146, and a timing controller 148. The controller 140 may further include a display mode determination unit (not shown).

The first look-up table 142 includes a weight of each of the N×k sub-fields and on/off information at each of the N×k sub-fields corresponding to a gray level of the image signal of the 2D display mode. For example, the image signal of the one frame is converted to the 2D image data DATA1 having information at each of the 2N sub-fields through the first look-up table 142. For example, when the one frame includes 8 sub-fields and the 2D image data DATA1 is represented by 8 bit data, each bit represents emission or non-emission of each sub-field. The weight of each sub-field determines an emission time of the corresponding sub-field.

The second look-up table 144 includes a weight of each of the N sub-fields and on/off information at each of the N sub-fields corresponding to a gray level of the image signal of the stereoscopic display mode. Thus, the image signal of the one frame is converted to the stereoscopic image data DATA2 having information at each of the N sub-fields through the second look-up table 144. For example, the stereoscopic image data DATA2 is represented by 4 bits data (having on or off states at each of 4 sub-fields) when the 2D image data DATA1 is represented by 8 bit data (having on or off states at each of 8 sub-fields). The stereoscopic image data corresponds to one of left-eye image data and right-eye image data.

In one example embodiment, the total emission time of the N sub-fields stereoscopic image data DATA2 corresponds to half of the total emission time of the 2N sub-field 2D image data DATA1. Thus, stereoscopic images based on two stereoscopic image data DATA2 (i.e., the left-eye image data and the right-eye image data) is displayed by the display panel 110 during a time period corresponding to the one frame in which one of the 2D image is displayed by the 2D image data DATA1.

The weight of a J-th sub-field of the stereoscopic image data DATA2 may be different from the weight of a J-th sub-field of the 2D image data DATA1, where J is a positive integer, and is less than or equal to N. For example, the emission time period of a first sub-field generated by the stereoscopic image data DATA2 may be different from the emission time period of a first sub-field generated by the 2D image data DATA1.

The memory controller 146 controls the overall operations of the frame memory 150. The memory controller 146 controls an address where a write operation and a read operation are performed and timings. The memory controller 146 performs the write and read operations of the stereoscopic image data DATA2 in various methods.

The timing controller 148 transfers pixel data RGB DATA that is read from the frame memory 150 (i.e., the 2D image data and/or the stereoscopic image data) to the data driver 130. In addition, the timing controller 148 control the scan driver 120 and the data driver 130.

The timing controller 148 generates a first control signal CNT1 to control the scan driver 120 and applies the first control signal CNT1 to the scan driver 120. The timing controller 148 generates a second control signal CNT2 to control the data driver 130 and applies the second control signal CNT2 to the data driver 130.

The frame memory 150 stores one of the 2D image data DATA1 and the stereoscopic image data DATA2. In one example embodiment, the frame memory 150 includes a first memory for storing the 2D image data DATA1, a second memory for storing the left-eye image data, and a third memory for storing the right-eye image data.

As described above, the controller 140 in the OLED display 100 employing the digital driving technique according to example embodiments receives the image signal at a constant input frequency regardless of the current display mode, converts the image signal to the 2D image data that is determined to be 2N-bit (or 3N-bit, 4N-bit, etc.), and converts the image signal to the stereoscopic image data that is determined to be a half of (or ⅓, ¼, etc.) the 2D image data (i.e., N-bit). Thus, the output frequency of the controller 140 compared with the constant input frequency is effectively doubled (or tripled, quadrupled) when the OLED display 100 is driven in the stereoscopic display mode. As a result, it is not necessary to increase the input frequency in the stereoscopic display mode, so that power consumption can be decreased. Further, frequency amplification apparatuses such as a frequency acceleration engine, a frequency scaler, etc., are removed from the OLED display 100 so that circuits of the OLED display 100 can be simplified.

Figure 2:
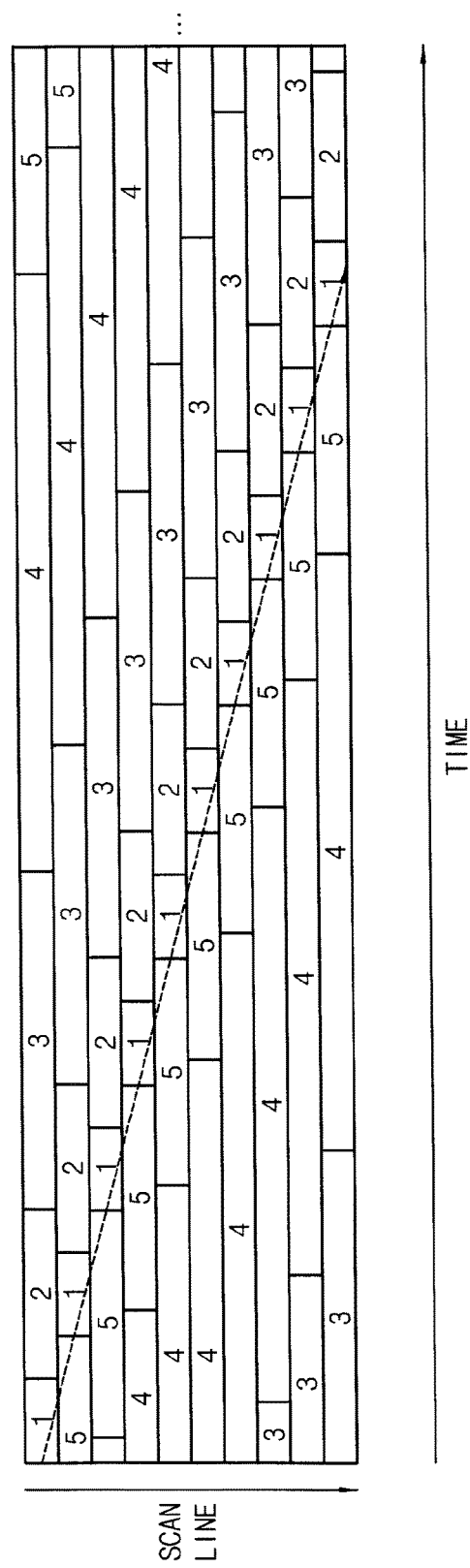
FIG. 2 is a diagram illustrating an example in which the OLED display of FIG. 1 operates based on a digital driving technique.

FIG. 2 is a diagram illustrating an example in which the OLED display of FIG. 1 operates based on a digital driving technique.

Referring to FIGS. 1 and 2, the OLED display can employ a progressive emission with simultaneous scan (PESS) method.

The OLED display 100 can employ a digital driving technique that divides one frame into a plurality of sub-fields. In FIG. 2, one frame is illustrated as being divided into first through fifth sub-fields SF1, SF2, SF3, SF4, and SF5, with the fifth sub-field SF5 corresponding to a blank sub-field. Here, the number of sub-fields of one frame can be determined according to required conditions. In addition, the blank sub-field SF5 may be omitted.

Each sub-field of one frame has a scan time period during which a scan signal is provided to pixels, an emission time period during which the pixels emits light based on a data signal (e.g., the 2D image data or the stereoscopic image data), and a reset time period (not illustrated) during which the pixels are reset (i.e., the states of the pixels are changed from an emission state to a non-emission state). In detail, except for the fifth sub-field (i.e., the blank sub-field), each emission time period of the first through fourth sub-fields differs by a factor of 2 (i.e., by a weight). That is, each emission time period of the first through fourth sub-fields is set to a different length. Thus, each emission time period of the first through fourth sub-fields corresponds to each bit of the data signal. For example, as illustrated in FIG. 2, the emission time period of the second sub-field is twice of the emission time period of the first sub-field, the emission time period of the third sub-field is twice of the emission time period of the second sub-field, and the emission time period of the fourth sub-field is twice of the emission time period of the third sub-field. Here, the sub-field having the longest emission time period (i.e., the fourth sub-field) corresponds to the most significant bit (MSB) of the data signal, and the sub-field having the shortest emission time period (i.e., the first sub-field) corresponds to the least significant bit (LSB) of the data signal. As a result, the specific gray level is implemented based on a sum of the emission time periods of the first through fourth sub-fields.

FIG. 2 shows a digital driving technique employing a random scan method (i.e., the PESS method) for an OLED display 100. As illustrated in FIG. 2, the digital driving technique of the PESS method randomly performs scan operations of all scan-lines for each sub-frame 1, 2, 3, 4, and 5 by shifting each sub-frame scan timing of the scan-lines by a specific time period, and thus randomly (i.e., separately) performs emission operations of all scan-lines for each sub-frame 1, 2, 3, 4, and 5. Here, the sub-frame emission order of all scan-lines is fixed (e.g., in order of 1, 2, 3, 4, and 5).

Figure 3:
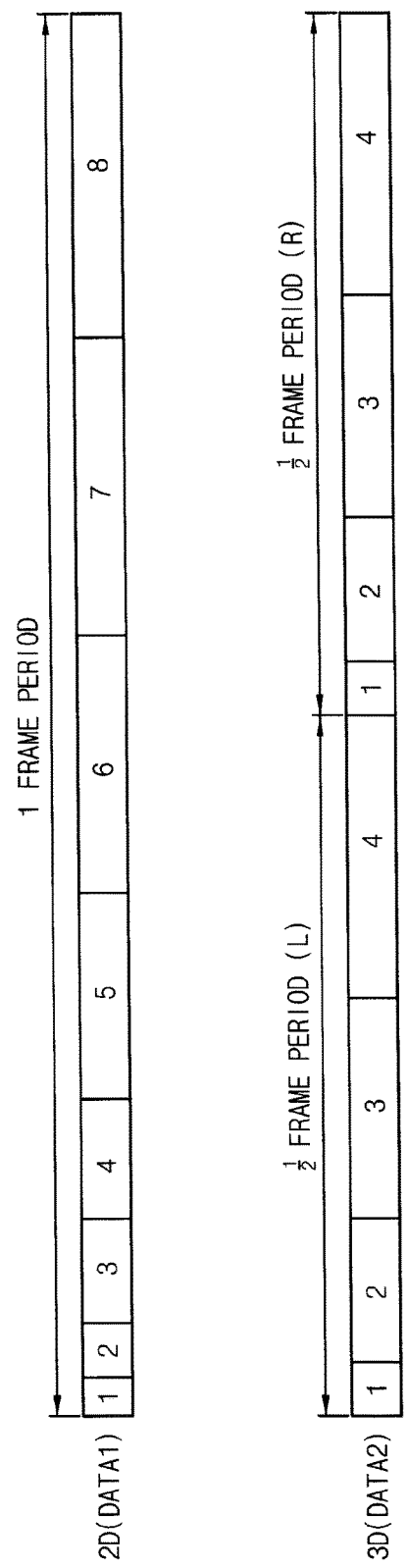
FIG. 3 is a diagram illustrating an example of an image data generated in the OLED display of FIG. 1.

FIG. 3 is a diagram illustrating an example of image data generated in an OLED display of FIG. 1.

Referring to FIGS. 1 through 3, the controller 140 in the OLED display 100 generates the 2D image data DATA1 and/or the stereoscopic image data DATA2.

The 2D image data can be determined to be N-bit (or 2N-bit). For example, as illustrated in FIG. 3, the 2D image data can be determined to be 8 bit and one frame is divided into 8 sub-fields.

In one example embodiment, the stereoscopic image data is determined to be N/2-bit (or N-bit). For example, as illustrated in FIG. 3, the stereoscopic image data can be determined to be 4 bit and half of the one frame is divided into 4 sub-fields. Thus, the controller 140 outputs two stereoscopic image data corresponding to a specific pixel within the one frame. In one example embodiment, one of the stereoscopic image data corresponds to a left-eye image data and the other stereoscopic image data corresponds to a right-eye image data. However, the number of s sub-fields constituting the one frame is not limited thereto.

In one example embodiment, the weight of a J-th sub-field of the stereoscopic image data DATA2 can be different from the weight of a J-th sub-field of the 2D image data DATA1, where J is a positive integer, and is less than or equal to N. For example, the emission time period of a first sub-field by the stereoscopic image data DATA2 can be longer than the emission time period of a first sub-field by the 2D image data DATA1.

Figure 4:
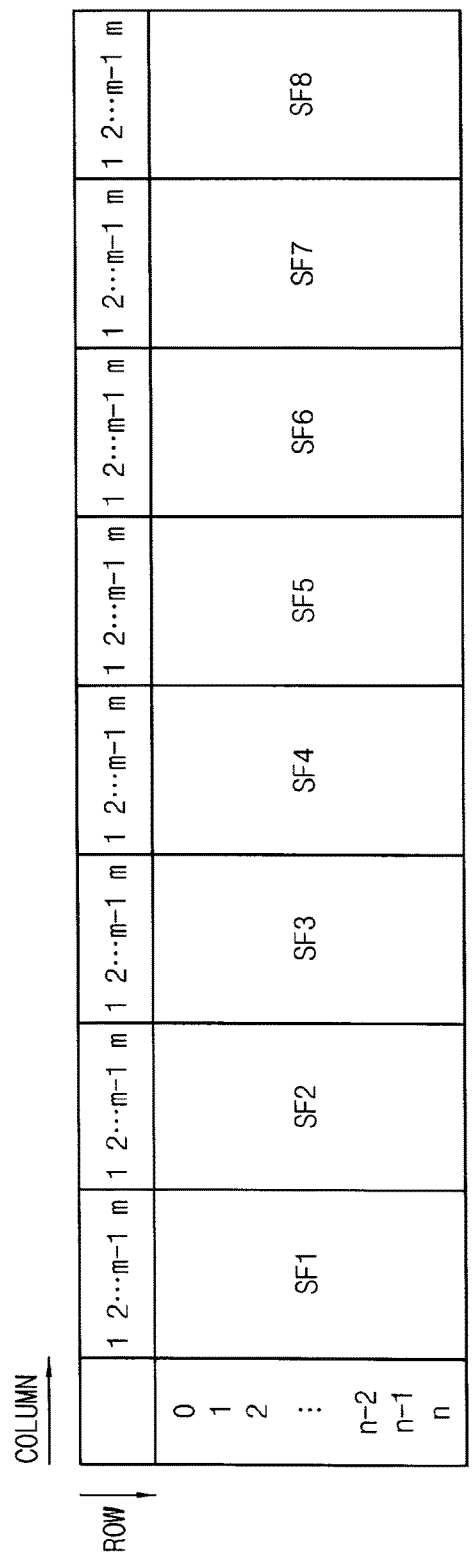
FIG. 4 is a diagram illustrating an example of a two-dimensional image data generated by a first look-up table stored in a frame memory of the OLED display of FIG. 1.

FIG. 4 is a diagram illustrating an example of a two-dimensional image data generated by a first look-up table stored in a frame memory of the OLED display of FIG. 1.

Referring to FIGS. 1 through 4, the controller 140 of the OLED display 100 includes a first look-up table 142 that converts the image signal to the 2D image data DATA1. The first look-up table 142 includes a weight of each of the 8 sub-fields SF1 through SF8 and on/off information at each of the 8 sub-fields SF1 through SF8 corresponding to a gray level of the image signal of the 2D display mode. For example, the first look-up table 142 can be as illustrated in the following TABLE 1.

TABLE 1

| GRAY LEVEL | sf | | | | | | | |
|---|---|---|---|---|---|---|---|---|
| | SF1 | SF2 | SF3 | SF4 | SF5 | SF6 | SF7 | SF8 |
| 0 | 0 | 0 | 0 | 0 | 0 | 0 | 0 | 0 |
| 1 | 1 | 0 | 0 | 0 | 0 | 0 | 0 | 0 |
| . | . | . | . | . | . | . | . | . |
| . | . | . | . | . | . | . | . | . |
| . | . | . | . | . | . | . | . | . |
| 254 | 0 | 1 | 1 | 1 | 1 | 1 | 1 | 1 |
| 255 | 1 | 1 | 1 | 1 | 1 | 1 | 1 | 1 |

Since this is an example, the gray level, the number of sub-fields, and the on/off information of the sub-fields are not limited thereto.

As illustrated in TABLE 1, in one embodiment, one frame is divided into 8 sub-fields SF1 through SF8. In one example embodiment, when the number of gray levels to be displayed by the display panel 110 is, e.g., 256, the 2D image data DATA1 can be determined to be 8 bit data. Each bit represents whether each of the subfields emits light. For example, a first subfield SF1 is set to emit light when the least significant bit (LSB) of the 2D image data DATA1 is set as "1" and a eighth subfield is set not to emit light when the most significant bit (MSB) of the 2D image data DATA1 is set as "0". For example, when the image signal has information of a gray level 182, the first look-up table 142 converts the image signal to the 2D image signal DATA1 as "10110110".

As illustrated in FIG. 4, the 2D image data DATA1 can be stored in the frame memory 150 by a write operation of the memory controller 146. FIG. 4 shows a frame memory map in which the 2D image data DATA1 are (is) stored in the frame memory 150 at a specific time.

Emission information and address information of each of the sub-fields SF1 through SF8 of the 2D image data DATA1 can be stored in the frame memory 150. The address information includes a first location information ROW and a second location information COLUMN. The first location information ROW refers to the row line information corresponding to a scan line of the display panel 110. The second location information COLUMN refers to the column line information corresponding to a data line of the display panel 110. The emission information refers to the on/off information of each of the sub-fields SF1 through SF8.

The memory controller 146 includes a write controller that writes the 2D image data DATA1 generated by the first look-up table 142 to the frame memory 150 and a read controller that reads the 2D image data DATA1 written at the frame memory 150. A 2D image can be displayed on the display panel 110 by the read controller that read the written 2D image data DATA1. In one example embodiment, the 2D image data DATA1 that is read by the read controller is converted to the pixel data RGB DATA representing the on or off states of the pixel at each of 8 sub-fields. The pixel data RGB DATA can be applied to the display panel 110.

Figure 5A:
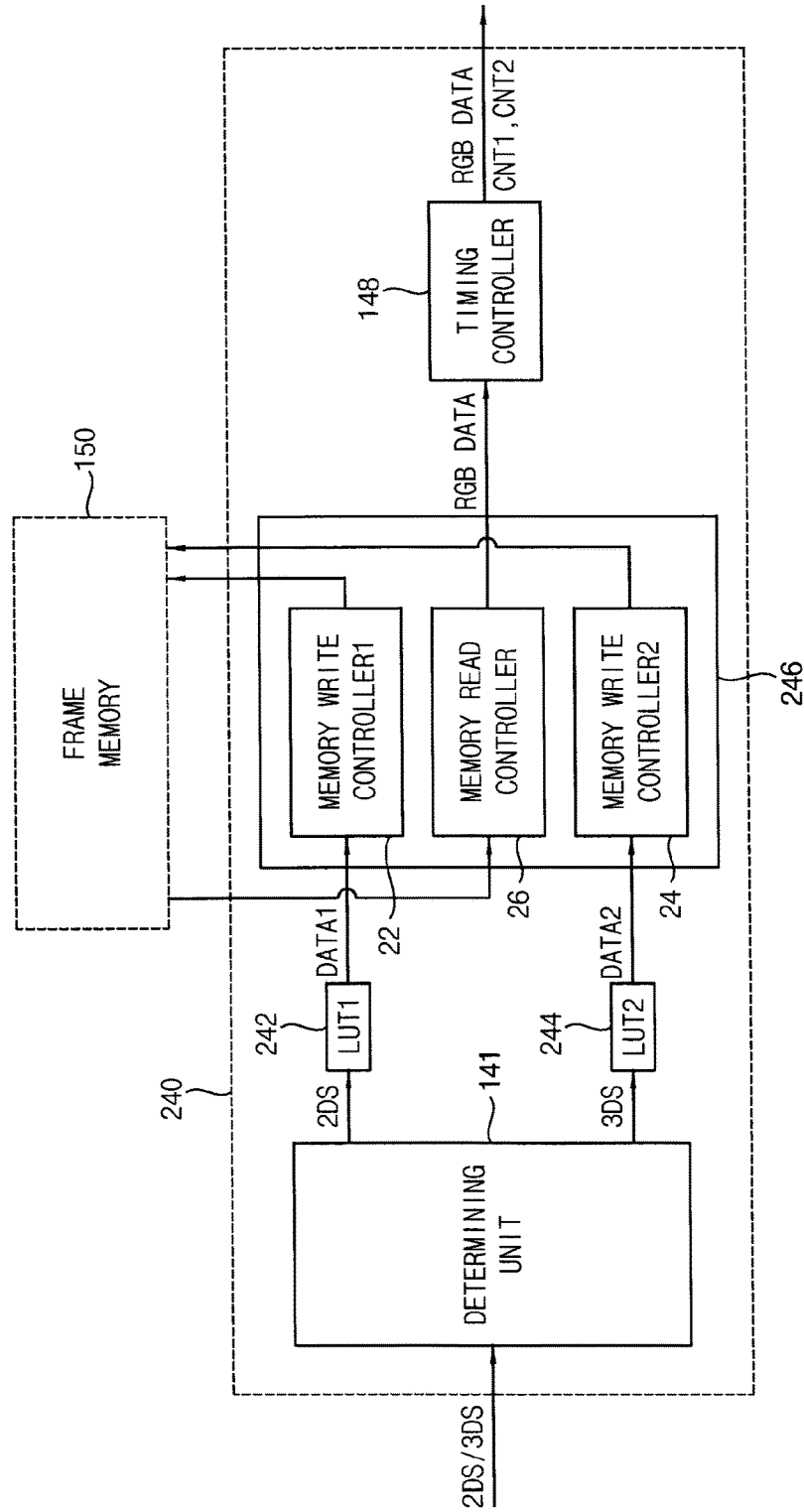
FIG. 5A is a block diagram illustrating an example of a controller included in the OLED display of FIG. 1.
Figure 5B:
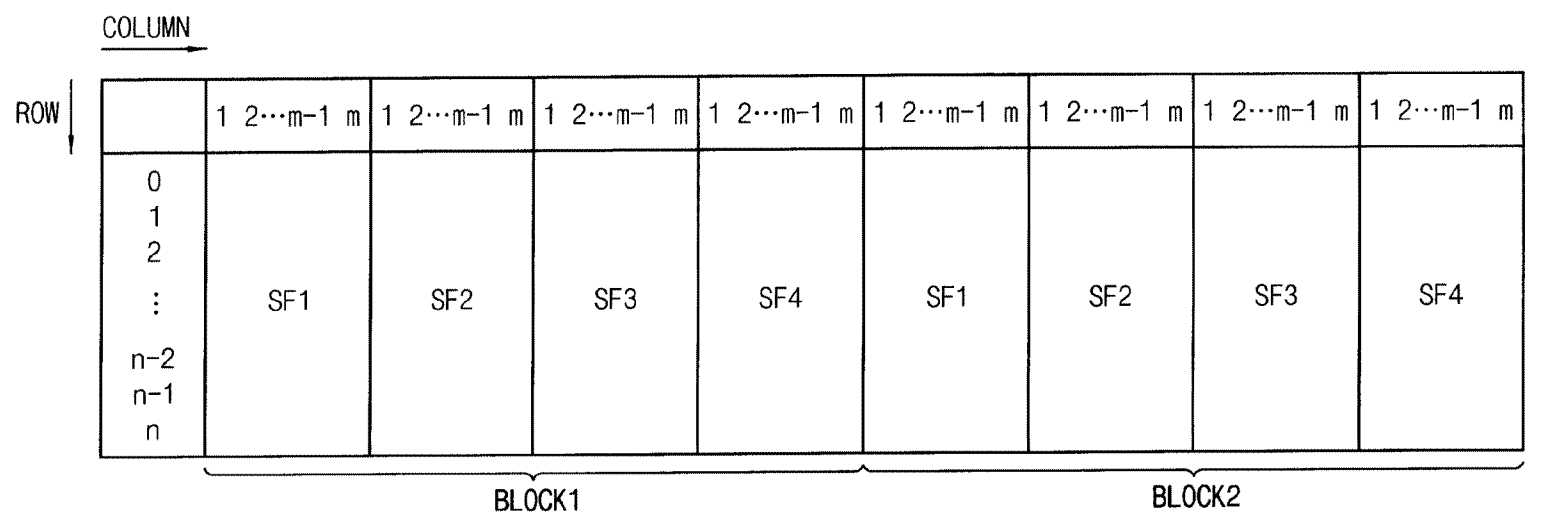

FIG. 5A is a block diagram illustrating an example of a controller included in the OLED display of FIG. 1. FIG. 5B is a block diagram illustrating an example of a stereoscopic image data stored in a frame memory due to the operation of the controller of FIG. 5A.

Referring to FIGS. 1 through 5B, the controller 240 includes a display mode determination unit or determining unit 141, a first look-up table 242, a second look-up table 244, a memory controller 246, and a timing controller 148. The controller 240 may further include an image processor. The stereoscopic image data DATA2 can be respectively stored a first half BLOCK1 and a second half BLOCK2 of the frame memory 150.

The display mode determination unit 141 receives the image signal 2DS/3DS. The display mode determination unit 141 determines whether a display mode of the OLED display is the 2D display mode or the stereoscopic display mode. The display mode determination unit 141 outputs the image signal 2DS to the first look-up table 242 when the display mode is the 2D display mode and outputs the image signal 3DS to the second look-up table 244 when the display mode is the stereoscopic display mode.

The image signal 2DS is converted to the 2D image data DATA1 determined to be 2N-bit by the first look-up table 242 when the display mode is the 2D display mode. For example, as illustrated in TABLE 1, the 2D image data DATA1 can be determined to be 8 bit, and one frame is divided into 8 sub-fields.

The image signal 3DS is converted to the stereoscopic image data DATA2 determined to be N-bit by the second look-up table 244 when the display mode is the stereoscopic display mode. In one example embodiment, the second look-up table 244 includes a weight of each of the 4 sub-fields SF1 through SF4 and on/off information at each of the 4 sub-fields SF1 through SF4 corresponding to a gray level of the image signal of the stereoscopic display mode when the 2D image is displayed by 8 bit 2D image data DATA1 (i.e., one frame of the 2D image is divided into 8 sub-fields). For example, the second look-up table 244 may be as illustrated in the following TABLE 2.

TABLE 2

| GRAY LEVEL | sf | | | |
|---|---|---|---|---|
| | SF1 | SF2 | SF3 | SF4 |
| 0 | 0 | 0 | 0 | 0 |
| 1 | 1 | 0 | 0 | 0 |
| . | . | . | . | . |
| . | . | . | . | . |
| . | . | . | . | . |
| 254 | 0 | 1 | 1 | 1 |
| 255 | 1 | 1 | 1 | 1 |

Since this is an example, the gray level, the number of sub-fields, and the on/off information of the sub-fields are not limited thereto.

One frame can be divided into a left-eye image frame and a right-eye image frame. The left-eye image frame and the right-eye image frame can be divided into 4 sub-fields SF1 through SF4, respectively. As illustrated in TABLE 1, half of the one frame is divided into 4 sub-fields SF1 through SF4. Thus, the pixel emits light based on the two stereoscopic image data DATA2 within the one frame. In one example embodiment, one of the stereoscopic image data DATA2 corresponds to the left-eye image data or the right-eye image data of the one frame.

The number of subfields (or the number of bits) in the stereoscopic display mode corresponds to about half of the subfields in the 2D display mode such that a quantity of the stereoscopic image data DATA2 output from the controller 240 is about twice of the 2D image data DATA1 during certain durations. Thus, the stereoscopic image is displayed without increasing the input frequency.

The memory controller 246 includes a first write controller 22, a second write controller 24, and a read controller 26.

The first write controller 22 writes the 2D image data DATA1 of the one frame to the frame memory 150. The first write controller 22 controls the write operation of the 2D image data DATA1. For example, the first write controller 22 controls the write timing that the 2D image data DATA1 is written in the frame memory 150 and a write clock. The first write controller 22 provides address information where the write operation will be performed to the frame memory 150. Thus, the 2D image data DATA1 is written in the frame memory 150 according to the address information.

As illustrated in FIG. 4, the frame memory 150 stores emission information and address information of each of the sub-fields SF1 through SF8 based on the operation of the first write controller 22.

As illustrated in FIG. 5B, the second write controller 24 writes the stereoscopic image data DATA2 of a first frame to a first half BLOCK1 of the frame memory 150 and writes the stereoscopic image data DATA2 of a second frame following the first frame to a second half BLOCK2 of the frame memory 150. FIG. 5B shows a frame memory map in which the stereoscopic image data DATA2 are (is) stored in the frame memory 150 at a specific time. The sizes of each stereoscopic image data DATA2 is half of the size of each 2D image data DATA1 so that two stereoscopic image data DATA2 are stored in the first half BLOCK1 and second half BLOCK2 of the frame memory 150, respectively. For example, the first half BLOCK1 of the frame memory 150 corresponds to an area where information of the first through fourth sub-fields of the 2D image data DATA1 is stored and the second half BLOCK2 of the frame memory 150 corresponds to an area where information of the fifth through eighth sub-fields of the 2D image data DATA1 is stored. Therefore, as illustrated in FIG. 5B, two stereoscopic image data DATA2 can be respectively stored in the first half BLOCK1 and the second half BLOCK2 of the frame memory 150.

The read controller 26 reads the 2D image data DATA1 from the frame memory 150. The read controller 26 reads the 8 bit 2D image data DATA1 and provides the image data DATA1 to the timing controller 148.

In one example embodiment, the read controller 26 reads the stereoscopic image data DATA2 from the first half BLOCK1 and the second half BLOCK2 of the frame memory 150. Two stereoscopic image data DATA2 each having 4 bits are stored in the frame memory 150, so that the read controller for reading the 2D image data can read the stereoscopic image data DATA2. Therefore, additional read controller for reading the stereoscopic image data DATA2 is not needed.

The controller 240 may further include an image processor. In one example embodiment, the image data (i.e., the 2D image data DATA1 or the stereoscopic image data DATA2) read by the read controller can be applied to the image processor. The image processor may generate the pixel data RGB DATA based on the 2D image data DATA1 or the stereoscopic image data DATA2 and apply the pixel data RGB DATA to the timing controller 148. For example, the image processor may generate the 2D image pixel data based on the read 2D image data DATA1 and generate the left-eye stereoscopic image pixel data and/or the right-eye stereoscopic image pixel data based on the read stereoscopic image data DATA2.

The timing controller 148 applies the first control signal CNT1 to the scan driver 120 and the second control signal CNT2 to the data driver 130.

As illustrated in FIG. 5B, emission information and address information of each of the sub-fields SF1 through SF4 of the stereoscopic image data DATA2 can be stored in the frame memory 150. The address information includes a first location information ROW and a second location information COLUMN. The first location information ROW refers to row line information corresponding to a scan line of the display panel 110. The second location information COLUMN refers to column line information corresponding to a data line of the display panel 110. The emission information represents the on/off information of each of the sub-fields SF1 through SF4.

As described above, the controller 240 in the OLED display 100 employing the digital driving technique according to example embodiments receives the image signal at a constant input frequency regardless of display mode, converts the image signal to the 2D image data that is determined to be 2N-bit, and converts the image signal to the stereoscopic image data that is determined to be a half of the 2D image data (i.e., N-bit). Thus, the output frequency of the controller 240 compared to the constant input frequency is effectively doubled when the OLED display 100 is driven in the stereoscopic display mode. As a result, it is not necessary to increase the input frequency in the stereoscopic display mode, so that power consumption can be decreased. Further, frequency amplification apparatuses such as a frequency acceleration engine, a frequency scaler are, etc., can be removed in the OLED display 100 so that circuits of the OLED display 100 can be simplified. In addition, only one read controller 26 can be used control both the read operation of the 2D image data DATA1 and the read operation of the stereoscopic image data DATA2. Thus, an additional read controller is not needed.

Figure 6A:
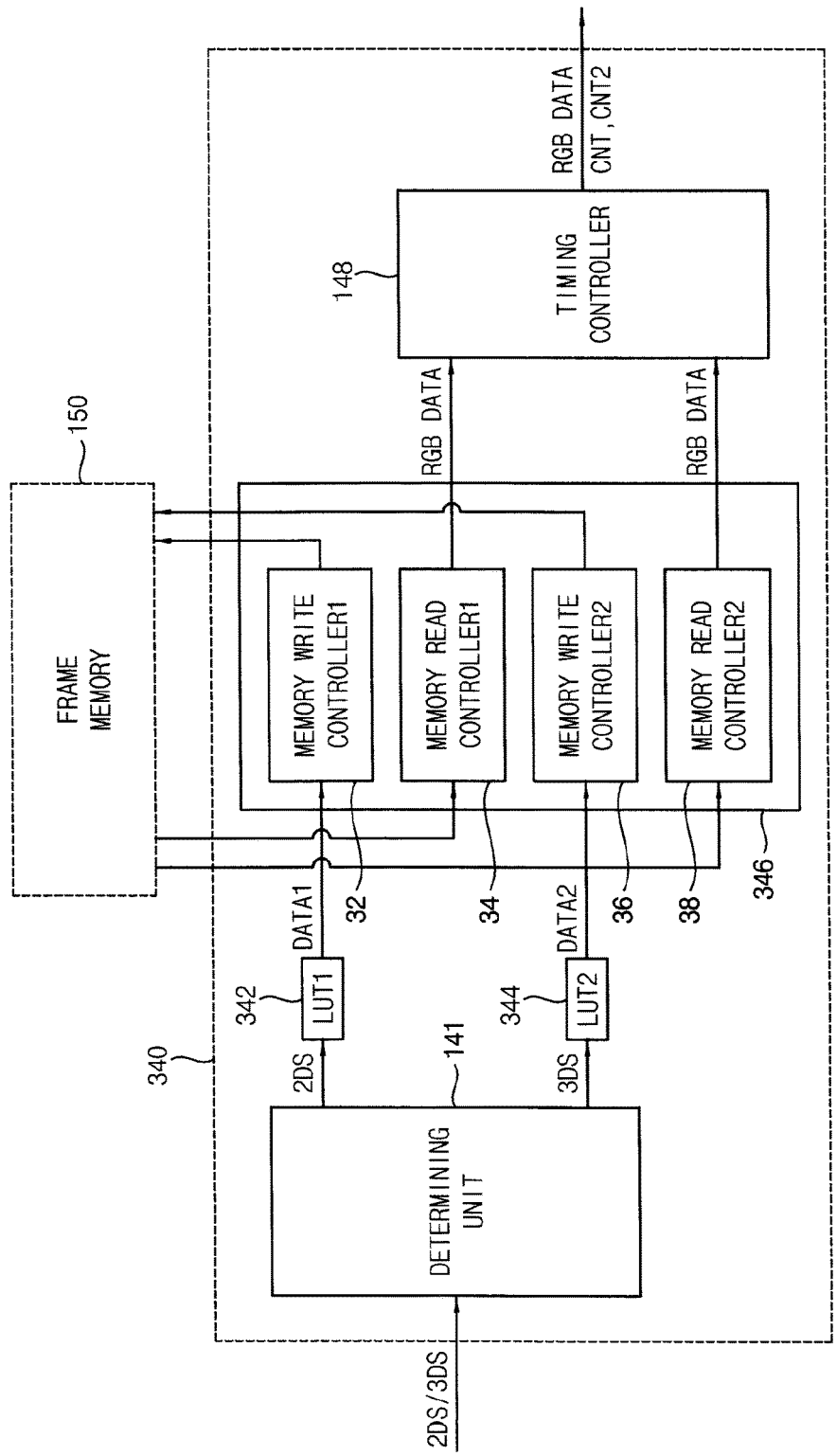
FIG. 6A is a block diagram illustrating another example of the controller included in the OLED display of FIG. 1.
Figure 6B:
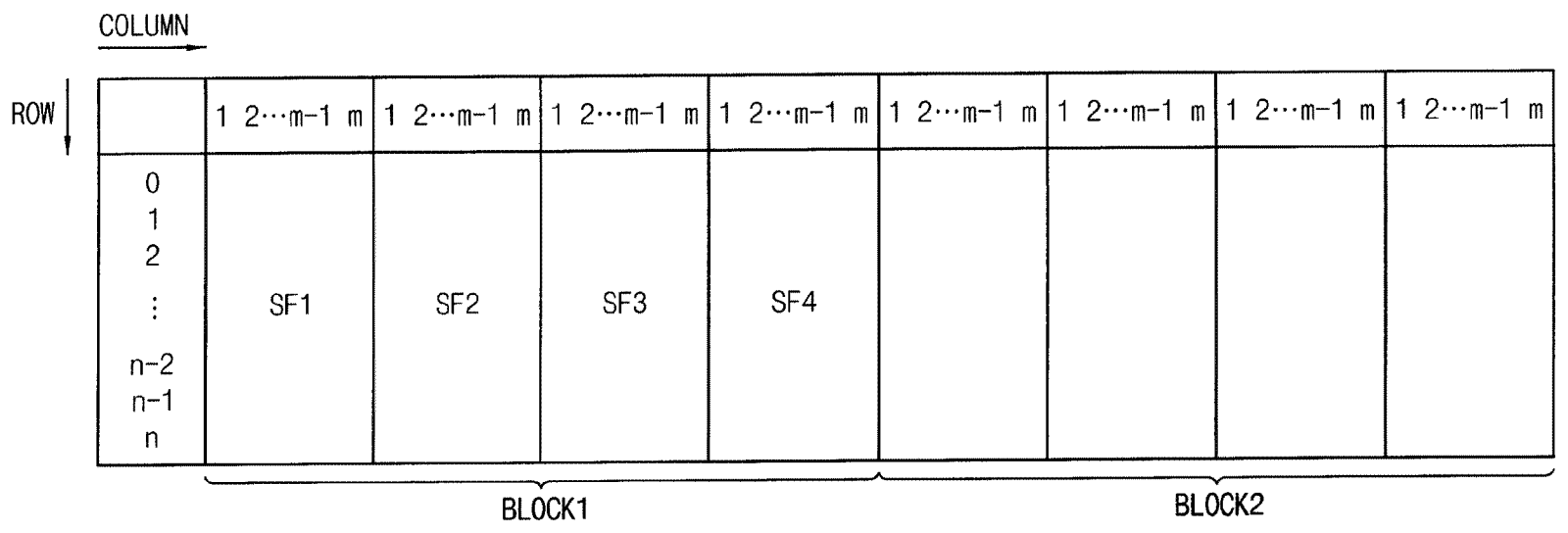

FIG. 6A is a block diagram illustrating another example of the controller included in the OLED display of FIG. 1. FIG. 6B is a block diagram illustrating an example of a stereoscopic image data stored in a frame memory due to the operation of the controller of FIG. 6A.

Referring to FIGS. 1 through 4, 6A and 6B, the controller 340 includes a display mode determination unit 141, a first look-up table 342, a second look-up table 344, a memory controller 346, and a timing controller 148. The controller 340 may further include an image processor. The stereoscopic image data DATA2 may be respectively stored a first half BLOCK1 and a second half BLOCK2 of the frame memory 150.

The controller of the present example embodiments is substantially the same as the controller explained with reference to FIG. 5A except for construction of the memory controller 340. Thus, the same reference numerals will be used to refer to the same or like parts as those described in the example embodiments of FIGS. 1 through 5B, and any repetitive explanation concerning the above elements will be omitted.

The display mode determination unit 141 receives the image signal 2DS/3DS. The display mode determination unit 141 outputs the image signal 2DS to the first look-up table 242 when the display mode is the 2D display mode and outputs the image signal 3DS to the second look-up table 244 when the display mode is the stereoscopic display mode.

The first look-up table 342 employs the look-up table of TABLE 1 and the second look-up table 344 employs the look-up table of TABLE 2.

The memory controller 346 includes a first write controller 32, a first read controller 34, a second write controller 36, and a second read controller 38.

The first write controller 32 writes the 2D image data DATA1 of the one frame to the frame memory 150. The first write controller 32 controls the write operation of the 2D image data DATA1. The first read controller 34 reads the 2D image data DATA1 from the frame memory 150. Since the operations of the timing controller 340 in the 2D display mode have been described above referred to FIGS. 1 through 4, duplicate descriptions thereof will not be repeated.

As illustrated in FIG. 6B, the second write controller 36 writes the stereoscopic image data DATA2 corresponding to half of the one frame to a first half BLOCK1 of the frame memory 150. FIG. 6B shows a frame memory map in which the stereoscopic image data DATA2 are (is) stored in the frame memory 150 at a specific time. The second write controller 34 writes the stereoscopic image data DATA2 to the frame memory 150. The size of each stereoscopic image data DATA2 is half of the size of each 2D image data DATA1 so that the stereoscopic image data DATA2 is stored in the first half BLOCK1 by the operation of the second write controller 34. For example, the 4 bit stereoscopic image data DATA2 is stored in the first half BLOCK1 of the frame memory 150.

The second read controller 38 reads the stereoscopic image data DATA2 from the half BLOCK1 of the frame memory 150. In one example embodiment, image processor converts the 2D image data DATA1 or the stereoscopic image data DATA2 to the pixel data RGB DATA.

As described above, the size (i.e., the number of bits) of the stereoscopic image data DATA2 corresponds to about half of the size of the 2D image data DATA1, so that the output frequency of the controller 340 compared with the constant input frequency is effectively doubled (or three times, four times) when the OLED display 100 is driven in the stereoscopic display mode. In addition, the size of the stereoscopic image data DATA2 written (or stored) in the frame memory decreases so that power consumption by controlling the frame memory 150 can be improved.

Figure 7A:
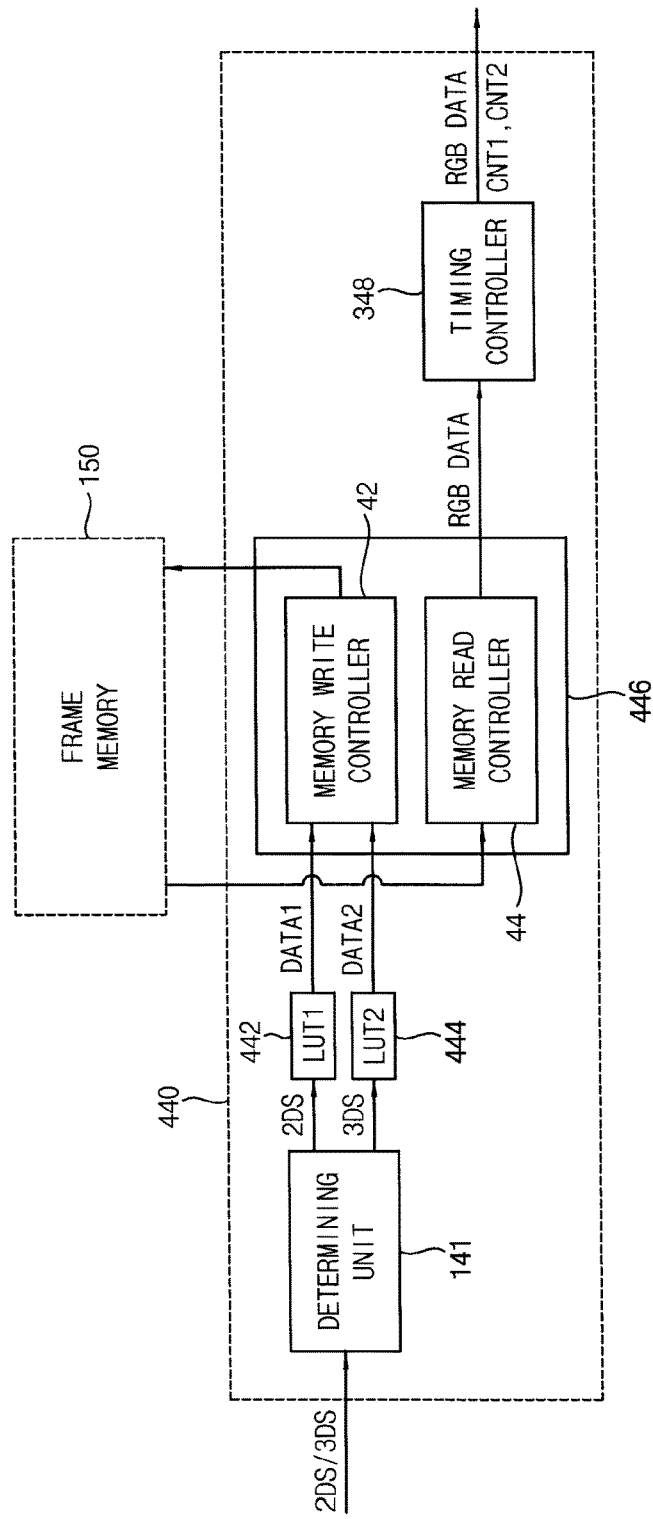
FIG. 7A is a block diagram illustrating still another example of the controller included in the OLED display of FIG. 1.
Figure 7B:
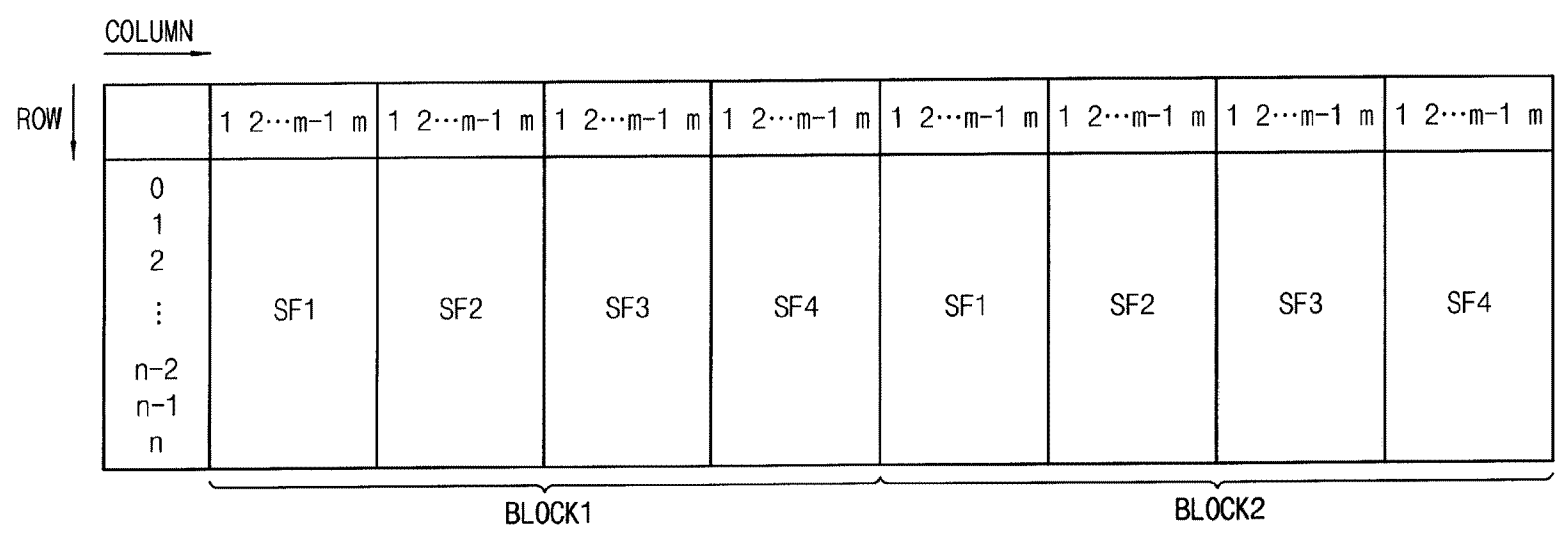

FIG. 7A is a block diagram illustrating still another example of the controller included in the OLED display of FIG. 1. FIG. 7B is a block diagram illustrating an example of a stereoscopic image data stored in a frame memory due to the operation of the controller of FIG. 7A.

Referring to FIGS. 1 through 4, 7A and 7B, the controller 440 includes a display mode determination unit 141, a first look-up table 442, a second look-up table 444, a memory controller 446, and a timing controller 148. The controller 440 may further include an image processor.

The controller of the FIG. 7A embodiment is substantially the same as the controller explained with reference to FIG. 5A except for construction of the second look-up table 444 and the memory controller 440. Thus, the same reference numerals will be used to refer to the same or like parts as those described in the example embodiments of FIGS. 1 through 5B, and any repetitive explanation concerning the above elements will be omitted. The first look-up table 442 employs the look-up table of TABLE 1.

The memory controller 446 includes a write controller 42 and a read controller 44.

The write controller 42 writes the 2D image data DATA1 of the one frame to the frame memory 150. The first write controller 42 controls the write operation of the 2D image data DATA1. The read controller 44 reads the 2D image data DATA1 from the frame memory 150. Since the operation of the timing controller 440 in the 2D display mode is described above referred to FIGS. 1 through 4, duplicate descriptions thereof will not be repeated.

The second look-up table 444 converts the image signal into two stereoscopic image data DATA2 each representing on or off states of the pixels at each of N sub-fields when k is 2. In one example embodiment, the two stereoscopic image data DATA2 may be substantially the same. For example, one selected image signal among image signals can be converted into a first stereoscopic image data and a second stereoscopic image data by the second look-up table 444. The first stereoscopic image data and the second stereoscopic image data may be substantially the same. In one example embodiment, the second look-up table 444 includes a weight of each of the 4 sub-fields SF1 through SF4 and on/off information at each of the 4 sub-fields SF1 through SF4 corresponding to a gray level of the image signal of the stereoscopic display mode when the 2D image is displayed by 8 bit 2D image data DATA1 (i.e., one frame of the 2D image is divided into 8 sub-fields). For example, the second look-up table 444 may be constituted as illustrated in the following TABLE 3. For example, the first stereoscopic image data and the second stereoscopic image data may have the on/off information at each of the 4 sub-fields SF1 through SF4

TABLE 3

| GRAY LEVEL | sf | | | | | | | |
|---|---|---|---|---|---|---|---|---|
| | SF1 | SF2 | SF3 | SF4 | SF1 | SF2 | SF3 | SF4 |
| 0 | 0 | 0 | 0 | 0 | 0 | 0 | 0 | 0 |
| 1 | 1 | 0 | 0 | 0 | 1 | 0 | 0 | 0 |
| . | . | . | . | . | . | . | . | . |
| . | . | . | . | . | . | . | . | . |
| . | . | . | . | . | . | . | . | . |
| 254 | 0 | 1 | 1 | 1 | 0 | 1 | 1 | 1 |
| 255 | 1 | 1 | 1 | 1 | 1 | 1 | 1 | 1 |

Since this is an example, the gray level, the number of sub-fields, and the on/off information of the sub-fields are not limited thereto.

One frame can be divided into a left-eye image frame and a right-eye image frame. The left-eye image frame and the right-eye image frame can be respectively divided into 4 sub-fields SF1 through SF4. Thus, the pixel emits light based on the two stereoscopic image data DATA2 within the one frame. In one example embodiment, one of the stereoscopic image data DATA2 corresponds to the left-eye image data or the right-eye image data of the one frame.

The number of subfields (or the number of bits) in the stereoscopic display mode corresponds to about half of the subfields in the 2D display mode such that the quantity of the stereoscopic image data DATA2 output from the controller 240 is about twice of the 2D image data DATA1 during certain durations. Thus, the stereoscopic image can be displayed without increasing the input frequency.

The memory controller 446 includes a write controller 42 and a read controller 44. The write controller 42 may be a common write controller that controls both a write operation of the 2D image data DATA1 and a write operation of the stereoscopic image data DATA2.

As illustrated in FIG. 7B, the write controller 42 writes the stereoscopic image data DATA2 of one frame output from the second look-up table 444 to the frame memory. In one example embodiment, the write controller 42 writes one of the stereoscopic image data DATA2 from the second look-up table 444 to a first half BLCOK1 of the frame memory 150 and writes the other of the stereoscopic image data DATA2 from the second look-up table 444 to a second half BLOCK2 of the frame memory 150. For example, the first stereoscopic image data is written at the first half BLOCK1 of the frame memory 150 and the second stereoscopic image data is written at the second half BLOCK2 of the frame memory 150. The frame memory map of FIG. 7B may be substantially the same as the frame memory map of FIG. 5B. The data sizes of the stereoscopic image data DATA2 output from the first look-up table 442 may be substantially the same as data size of the 2D image data DATA1 output from the first look-up table 442, so that the write controller 42 can be commonly used to write the 2D image data DATA1 and to write the stereoscopic image data DATA2. Thus, an additional write controller for writing the stereoscopic image data DATA2 is not needed.

The read controller 44 reads the stereoscopic image data DATA2 from the frame memory. In one example embodiment, the read controller 44 reads the stereoscopic image data from the first half BLOCK1 and the second half BLOCK2 of the frame memory 150. Two stereoscopic image data DATA2 each having 4 bits are stored in the frame memory 150, so that the read controller for reading the 2D image data can be employed to read the stereoscopic image data DATA2. Therefore, an additional read controller for reading the stereoscopic image data DATA2 is not needed. The stereoscopic image data DATA2 read by the read controller 44 can be converted to the pixel data RGB DATA by the image processor and the display panel 110 can display the stereoscopic images.

Since the frame memory map of FIG. 7B is described above referred to FIG. 5B, duplicate descriptions will not be repeated.

As described above, the 2D image data is determined to be 2N-bit (or 3N-bit, 4N-bit, etc.), and the stereoscopic image data is determined to be a half of (or ⅓, ¼, etc.) the 2D image data (i.e., N-bit). Thus, the output frequency of the controller compared with the constant input frequency is effectively doubled (or three times, four times) when the OLED display is driven in the stereoscopic display mode. As a result, it is not necessary to increase the input frequency in the stereoscopic display mode, so that power consumption can be decreased. Further, frequency amplification apparatuses such as a frequency acceleration engine, a frequency scaler, etc., are removed in the OLED display so that circuits of the OLED display 100 may be simplified.

FIG. 8 is a flow chart illustrating a method of driving an OLED display according to example embodiments.

Referring to FIG. 8, the method of driving the OLED display employing the digital driving technique includes determining whether the display mode of the OLED display is a two-dimensional (2D) display mode or a stereoscopic display mode S100. The method may include converting the image signal to 2D image data S120 representing on or off states of a plurality of pixels included in the OLED display at each of 2N-sub-fields (N is an integer greater than 1) when the display mode is the 2D display mode. The method may also include converting the image signal to stereoscopic image data S130 representing on or off states of the pixels at each of N-sub-fields when the display mode is the stereoscopic display mode. In one example embodiment, the OLED display employs a progressive emission with simultaneous scan (PESS) method.

In detail, an image signal is applied from an external image source to a controller in an input frequency. The controller may determine the display mode is the 2D display mode or the stereoscopic display mode based on the image signal S100. In one example embodiment, the image signal is applied to a first look-up table included in the controller when the OLED display is driven in the 2D display mode. In contrast, the image signal may be applied to a second look-up table included in the controller when the OLED display is driven in the stereoscopic display mode. In one example embodiment, the input frequency of the image signal applied to the controller in the 2D display mode is substantially the same as the input frequency of the image signal applied to the controller in the stereoscopic display mode.

When the OLED display is driven in the 2D display mode, the image signal may be converted to the 2D image data represented by 2N-bit S120. In other words, the image signal may be converted to the 2D image data representing on or off states of a plurality of pixels included in the OLED display at each of 2N-sub-fields when the display mode is the 2D display mode. In one example embodiment, the 2D image data is generated by the first look-up table that has a weight of each of the 2N-sub-fields and on/off information at each of the 2N-sub-fields corresponding to a gray level of the image signal of the 2D display mode. For example, one frame includes 8 sub-fields and the 2D image data is represented by 8 bit data.

The 2D image data may be written to the frame memory S140. In one example embodiment, the 2D image data is stored in the frame memory by writing operation of a memory controller. The memory controller may include a first write controller that writes the 2D image data generated by the first look-up table to the frame memory and a read controller that read the 2D image data written at the frame memory.

The 2D image data stored in the frame memory may be read and the 2D image may be displayed at the display panel S160. The 2D image data that is read by the read controller may be converted to the pixel data representing on or off states of the pixels at each of N-sub-fields such that the 2D images may be displayed. Since the method of displaying the 2D image is described above referred to FIGS. 1 through 4, duplicate descriptions thereof will not be repeated.

When the OLED display is driven in the stereoscopic display mode, the image signal may be converted to the stereoscopic image data represented by N-bit S130. In other words, the image signal is converted to stereoscopic image data representing on or off states of the pixels at each of N-sub-fields when the display mode is the stereoscopic display mode. In one example embodiment, the stereoscopic image data is generated by the second look-up table that has a weight of each of the N-sub-fields and on/off information at each of the N-sub-fields corresponding to a gray level of the image signal of the stereoscopic display mode. For example, when the one frame includes 8 sub-fields and the 2D image data is represented by 8 bit data, the stereoscopic data is represented by 4 bit data.

In one example embodiment, the weight of a J-th sub-field of the stereoscopic image data is different from the weight of a J-th sub-field of the 2D image data, where J is a positive integer, and is less than or equal to N.

The stereoscopic image data of a first frame may be written to a first half of the frame memory and the stereoscopic image data of a second frame following the first frame may be written to a second half of the frame memory S150. The memory controller may include a second write controller that writes the stereoscopic image data DATA2 to the first half and the second half of the frame memory. The sizes of each stereoscopic image data is half of the size of each 2D image data so that two stereoscopic image data are respectively stored in the first half and second half of the frame memory.

The stereoscopic image data stored the first half and the second half of the frame memory may be read and the stereoscopic image may be displayed at the display panel S170. Two stereoscopic image data each having N-bit (e.g., 4 bit) are stored in the frame memory, so that the read controller for reading the 2D image data can be employed to read the stereoscopic image data. Therefore, an additional read controller for reading the stereoscopic image data is not needed. In one example embodiment, a left-eye image data and a right-eye image data are generated based on the stereoscopic image data. However, read/write operations of the stereoscopic image data are not limited thereto. Since the method of displaying the stereoscopic image is described above referred to FIGS. 1 through 3, and 5 through 7B, duplicate descriptions will not be repeated.

As described above, the method of driving the OLED display according to example embodiments may convert the image data to the 2D image data or the stereoscopic image data. Here, the size (or the number of bits) of the stereoscopic image data is less than the 2D image data. For example, the size of the stereoscopic image data is about half of the 2D image data. Thus, the output frequency of the controller compared with the constant input frequency is effectively doubled when the OLED display is driven in the stereoscopic display mode. As a result, it is not necessary to increase the input frequency in the stereoscopic display mode, and thus power consumption can be decreased. Further, frequency amplification apparatuses such as a frequency acceleration engine, a frequency scaler, etc., are removed in the OLED display 100 so that circuits of the OLED display 100 can be simplified.

The present embodiments can be applied to any display device and any system including the display device. For example, the present embodiments may be applied to a television, a computer monitor, a laptop, a digital camera, a cellular phone, a smart phone, a smart pad, a personal digital assistant (PDA), a portable multimedia player (PMP), a MP3 player, a navigation system, a game console, a video phone, etc.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of invention as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The invention is defined by the following claims, with equivalents of the claims to be included therein.

What is claimed is:

1. An organic light-emitting diode (OLED) display, comprising:
    a display panel including a plurality of pixels;
    a scan driver configured to apply a scan signal to the display panel;
    a data driver configured to generate a data signal based on: i) two-dimensional (2D) image data in a 2D display mode and ii) stereoscopic image data in a stereoscopic display mode, wherein the data driver is further configured to apply the data signal to the display panel;
    a controller configured to: i) receive an image signal comprising a plurality of frames, each of the frames comprising a gray level for each of the pixels, and ii) convert each of the gray levels for one of the frames into a plurality of sub-fields, each of the sub-fields representing a digital on or off state for a corresponding one of the pixels, wherein each of the pixels is configured to emit light having the gray level for the one frame based on a combination of the digital on or off states for the corresponding pixel within the one frame; and
    a frame memory configured to store the 2D image data in the 2D display mode and the stereoscopic image data in the stereoscopic display mode,
    wherein, in the 2D display mode, the controller is further configured to convert the image signal to the 2D image data, each of the frames in the 2D image data comprising N×k sub-fields, and
    wherein, in the stereoscopic display mode, the controller is further configured to convert the image signal to the stereoscopic image data, each of the frames in the stereoscopic image data comprising N sub-fields, where N and K are integers greater than 1.

2. The device of claim 1, wherein the input frequency of the image signal applied to the controller in the 2D display mode is substantially the same as the input frequency of the image signal applied to the controller in the stereoscopic display mode.

3. The device of claim 1, further comprising a first look-up table storing data used to generate the 2D image data based on a weight for each of the N×k sub-fields and on/off information at each of the N×k sub-fields corresponding to a gray level of the image signal.

4. The device of claim 3, further comprising a second look-up table storing data used to generate the stereoscopic image data based on a weight for each of the N sub-fields and on/off information at each of the N sub-fields corresponding to a gray level of the image signal.

5. The device of claim 4, wherein the weight of a J-th sub-field of the stereoscopic image data is different from the weight of a J-th sub-field of the 2D image data, where J is a positive integer and is less than or equal to N.

6. The device of claim 4, wherein the controller includes:
    a memory controller configured to: i) control the frame memory to store the 2D image data and the stereoscopic image data and ii) read the 2D image data and the stereoscopic image data from the frame memory; and
    a timing controller configured to: i) transfer the 2D image data and the stereoscopic image data read from the frame memory to the data driver and ii) control the scan driver and the data driver,
    wherein k is 2.

7. The device of claim 6, wherein the controller further includes:
    a display mode determination unit configured to: i) receive the image signal, ii) determine whether the OLED display is in the 2D display mode or the stereoscopic display mode, iii) output the image signal to the first look-up table when the OLED display is in the 2D display mode, and iv) output the image signal to the second look-up table when the OLED display is in the stereoscopic display mode.

8. The device of claim 6, wherein the memory controller includes:
    a first write controller configured to write the 2D image data of one frame to the frame memory;
    a second write controller configured to: i) write the stereoscopic image data corresponding to a first half of one frame to a first half of the frame memory and ii) write the stereoscopic image data corresponding to a second half of one frame to a second half of the frame memory; and
    a read controller configured to: i) read the 2D image data from the frame memory and ii) read the stereoscopic image data from the first and second halves of the frame memory.

9. The device of claim 6, wherein the memory controller includes:
    a first write controller configured to write the 2D image data of one frame to the frame memory;

a second write controller configured to write the stereoscopic image data corresponding to a half of one frame to a half of the frame memory;

a first read controller configured to read the 2D image data from the frame memory; and a second read controller configured to read the stereoscopic image data from the half of the frame memory.

10. The device of claim 4, wherein the second look-up table further stores data used to convert the image signal to two stereoscopic image data each representing on or off states of the pixels at each of N sub-fields when k is 2.

11. The device of claim 10, wherein the two stereoscopic image data are substantially the same.

12. The device of claim 11, wherein the memory controller includes:

a write controller configured to: i) write one of the stereoscopic image data from the second look-up table to a first half of the frame memory and ii) write the other of the stereoscopic image data from the second look-up table to a second half of the frame memory; and a read controller configured to read the stereoscopic image data from the frame memory.

13. The device of claim 12, wherein the write controller is further configured to write the 2D image data of one frame to the frame memory and wherein the read controller is further configured to read the 2D image data from the frame memory.

14. The device of claim 1, wherein the data signal is applied to the display panel in a progressive emission with simultaneous scan (PESS) method.

15. A method of driving an organic light-emitting diode OLED display, the method comprising:

determining whether a display mode of the OLED display is a two-dimensional (2D) display mode or a stereoscopic display mode, wherein the OLED display comprises a plurality of pixels and a controller configured to receive an image signal from an external source at an input frequency, wherein the image signal comprises a plurality of frames, each of the frames comprising a gray level for each of the pixels;

converting the image signal to 2D image data when the display mode is the 2D display mode, the converting the image signal to the 2D image data comprising converting each of the gray levels for a first one of the frames into a plurality of first sub-fields, each of the first sub-fields representing a digital on or off state for a corresponding one of the pixels, each of the frames in the 2D image data comprising 2N sub-fields, where N is an integer greater than 1; and converting the image signal to stereoscopic image data when the display mode is the stereoscopic display mode, the converting the image signal to the stereoscopic image data comprising converting each of the gray levels for the one of the frames into the plurality of sub-fields, each of the frames in the stereoscopic image data comprising N sub-fields, wherein each of the pixels is configured to emit light having the gray level for the one frame based on a combination of the digital on or off states for the corresponding pixel within the one frame.

16. The method of claim 15, wherein the input frequency of the image signal applied to the controller in the 2D display mode is substantially the same as the input frequency of the image signal applied to the controller in the stereoscopic display mode.

17. The method of claim 15, wherein the OLED display further comprises first and second look-up tables, the method further comprising:

generating the 2D image data based on data stored in the first look-up table including a weight of each of the 2N-sub-fields and on/off information at each of the 2N-sub-fields corresponding to a gray level of the image signal; and generating the stereoscopic image data based on data stored in the second look-up table including a weight of each of the N-sub-fields and on/off information at each of the N-sub-fields corresponding to a gray level of the image signal.

18. The method of claim 17, wherein the weight of a J-th sub-field of the stereoscopic image data is different from the weight of a J-th sub-field of the 2D image data, where J is a positive integer, and is less than or equal to N.

19. The method of claim 18, wherein the OLED display further comprises a frame memory and wherein converting the image signal to the stereoscopic image data comprises:

writing the stereoscopic image data of a first frame to a first half of the frame memory;

writing the stereoscopic image data of a second frame following the first frame to a second half of the frame memory; and reading the stereoscopic image data from the first and second halves of the frame memory so as to display a stereoscopic image.

20. The method of claim 15, wherein the OLED display further comprises a frame memory and wherein converting the image signal to the 2D image data comprises:

writing the 2D image data of one frame to the frame memory; and reading the 2D image data from the frame memory so as to display a 2D image.

* * * * *